Nov. 10, 1942.  J. P. MINTON ET AL  2,301,739
GAIN CONTROL FOR SEISMOGRAPH AMPLIFIERS
Filed Oct. 27, 1939    9 Sheets-Sheet 1

Inventors
John P. Minton and
Earley M. Shook
By Dallas R. Lamont  Attorney

Nov. 10, 1942.  J. P. MINTON ET AL  2,301,739
GAIN CONTROL FOR SEISMOGRAPH AMPLIFIERS
Filed Oct. 27, 1939   9 Sheets-Sheet 2

Inventors
John P. Minton and
Earley M. Shook
By
Dallas R. Lamont  Attorney

Nov. 10, 1942.  J. P. MINTON ET AL  2,301,739
GAIN CONTROL FOR SEISMOGRAPH AMPLIFIERS
Filed Oct. 27, 1939  9 Sheets-Sheet 3

Fig. 5.

Inventors
John P. Minton and
Earley M. Shook
By Dallas R. Lamont
Attorney

Nov. 10, 1942.    J. P. MINTON ET AL    2,301,739
GAIN CONTROL FOR SEISMOGRAPH AMPLIFIERS
Filed Oct. 27, 1939    9 Sheets-Sheet 5

Inventors
John P. Minton and
Earley M. Shook
By
Dallas R. Lamont
Attorney

Nov. 10, 1942.  J. P. MINTON ET AL  2,301,739
GAIN CONTROL FOR SEISMOGRAPH AMPLIFIERS
Filed Oct. 27, 1939  9 Sheets-Sheet 6

Inventors
John P. Minton and
Earley M. Shook
By Dallas R. Lamont
Attorney

Patented Nov. 10, 1942

2,301,739

UNITED STATES PATENT OFFICE 2,301,739

GAIN CONTROL FOR SEISMOGRAPH AMPLIFIERS

John P. Minton and Earley M. Shook, Dallas, Tex., assignors, by mesne assignments, to Socony-Vacuum Oil Company, Incorporated, New York, N. Y., a corporation of New York Application October 27, 1939, Serial No. 301,674

1 Claim. (Cl. 177—352)

This invention relates generally to a method and apparatus for controlling the gain of one or more amplifiers. It is more particularly adapted at present to observing and recording waves of a transient nature; that is, waves whose magnitude change with time. One of the adaptations of this invention is the control of amplifiers in a conventional seismograph. This invention provides control in gain of amplifiers over one, two or three periods of time, depending upon how the operation is initiated and upon how much and what information is desired. In one condition it may be desirable to initiate the control by the time break impulse. In another condition it may be desirable to initiate the control by the direct traveling energy reaching the geophone farthest from the shot point. After having initiated the control by the selected means the remaining predetermined control is carried out automatically. This invention provides the method and apparatus for recording, for the general conditions, of all the data on a single seismogram from a spread when shot in one direction by detonating a single charge of explosive. It also provides a means of recording two adjacent reflections with the same order of amplitude but whose energies reaching the detector or geophone are of widely different amplitude. The three control periods may be used in a number of combinations which makes the apparatus versatile enough to accomplish all the desired gain control.

In the art of exploring subsurface strata by the use of artificially created seismic waves, it is customary to detonate a charge of explosives at a point on or near the earth's surface and record the seismic waves generated by the detonation of the explosives at predetermined points removed from the point of generation. From the data thus recorded it is possible to ascertain the depth of subsurface horizons, from which the seismic waves that are recorded have been reflected. The depths of these subsurface horizons or interfaces are computed from the velocity of the seismic waves and the time it takes for them to travel down to the reflecting horizon and return to the detecting instrument. This velocity will vary, dependent upon the density and elastic coefficients of the materials through which the wave travels. In addition to considering the velocity at which reflected waves will travel in subsurface strata, it is necessary to consider the velocity of their transmission through the unconsolidated, weathered, sedimentary surface of the earth.

The usual procedure when the exploration of an area is begun is to develop those velocities in the different strata by what is termed a "velocity program" which entails recording records of seismic waves which will give directly the velocities in these particular strata. After having once ascertained these velocities, they can be used throughout the area in computing the depth of the particular reflecting strata. Due to the fact that the weathered surface layer of the earth varies in thickness, it is necessary that the thickness of this weathered layer be computed for each spread or location of geophones. The thickness of the weathered layer often varies over a particular spread, making it necessary to apply corrections for each geophone. To obtain the data from which the thickness of the weathered layer is computed, charges of explosives are detonated at the selected shot points and the velocity of the wave travel through the weathered or surface layer is determined. It is necessary that the gain in amplification of a vacuum tube amplifier be at a high level in order that the break in the seismogram trace resulting from the arrival at the geophone of the first impulse of energy be very definite. As a consequence heretofore, it has been necessary to record these data on a separate seismogram from that on which reflected waves are recorded. Such a procedure would necessitate recording a plurality of seimograms to obtain the data from the weathered layer and records of the reflected waves from shallow subsurface interfaces because the gain setting for the first impulse is too high for recording the reflections from the shallow subsurface interfaces. Since the high cost of field operations makes the time factor of paramount importance, it is desirable to record all of these data on a single record from the detonation of a single charge of explosives. Such a procedure would result in savings in the amount of explosives required and in time required by the field party to record the data necessary on a single spread, as well as the time required for an interpreter to observe the data on a plurality of seismograms.

With previous methods of recording these data by the use of a plurality of charges of explosives, from which seismic waves have been recorded on a corresponding number of seismograms, it has been almost impossible to duplicate the conditions under which each charge of explosive is detonated, due to several factors, the most important of which being the changes in the conditions affecting the medium in which the shot is planted. When one charge of explosives is detonated in the bottom of a shot hole, a pocket or cavity is formed in some formations, while in others the bottom of the hole is filled in due to the fact that the medium forming the walls of the cavity is of loosely packed material. This sometimes results in a loss of as much as ten feet in the depth of the hole, and in extreme cases, where the bottom of the hole is in a quicksand material, as much as twenty or thirty feet of the hole are lost by the detonation of a single charge in it. Such changes in conditions under which successive charges of explosives are detonated introduce variable factors in the apparent velocities of the recorded waves. These variable factors make profiles computed from these data in error.

Efforts have been made to adapt an automatic volume control, somewhat similar to that developed for radio, to the seismograph amplifier for recording all of the information on a single seismogram. There are two inherent faults in the so-called automatic volume controls for the seismograph. The first is the AVC action depends upon the strength of the signal, and since there is always delay in such a workable device, the gain at any instant is dependent upon the strength or amplitude of the signal prior to said instant resulting in "nearly" the right control for only the general cases of seismic surveying. The second fault with the AVC is that the variable "losser circuit" introduces variable phase distortion. This variable phase distortion causes events to be recorded on a seismogram in an indiscriminate and distorted manner. The time relation between recorded events are therefore in error and the error is not constant.

Another scheme for controlling the gain of a seismograph amplifier is the application of some variable negative control grid bias. For this scheme to control the gain it must introduce frequency distortion. The controlled tube or tubes must be worked on the curved portion of the grid voltage-plate current characteristic to obtain control. This introduces frequencies in the output of the amplifier that do not exist at the input.

The invention herein described accomplishes the desired control without the faults found in AVC and control grid bias schemes. This invention produces the desired control and at the same time allows faithful reproduction by the amplifier.

In order to record all of the data on a single seismogram, an electric seismograph of the conventional type which includes a thermionic tube amplifier is used. Means are provided whereby the gain in amplification characteristic of the amplifier is controlled automatically over three successive periods of time. Since the time break impulse (instant of detonation impulse) may initiate the control sequence, the first period is from the time of arrival of the time break until just after the arrival of the last first break (first arrival of direct traveling energy at the geophone farthest from the explosive). Since the distance to the farthest geophone from the point of detonation is different for different lengths of spread the time required for the arrival of the direct traveling wave at the farthest geophone will be different. Therefore, the time of this first period is controllable to suit conditions. The second period of time is in general for the purpose of reducing suddenly the gain of the amplifiers to a very low level in order to record the following vibrations at an amplitude which can be interpreted. There are cases, however, where a reflection from a deeper interface has much more energy than a reflection from a shallow interface and in this case, in order to record the reflections with the same order of amplitude, the gain must be reduced between the time the first reflection of low amplitude arrives and the time the second reflection of high amplitude arrives. The time for contraction is, therefore, variable in order to record such reflections with the same order of amplitude. In general, however, this second period is short. The third period generally is of longer duration and the gain is made to vary approximately inversely as the energy received, so that the reflections will be recorded with the same order of amplitude. Sometimes a condition arises where a reflection of low energy follows relatively close behind a reflection of high energy, and it is desired to record them both at about the same amplitude. This third period has predetermined control over a wide range and by proper adjustment the two reflections may be recorded with relatively the same amplitude.

It is evident that if the gain of the amplifiers is changed too fast, distortion will be introduced. Except for the case where the gain is changed suddenly from the high value in the first period to a lower value in the second period the limits on the controls in the apparatus to be described are set so that the gain cannot be changed fast enough to introduce distortion. For the case just mentioned, where distortion is introduced, it is of no consequence because it occurs over the short time when the recorded direct traveling energy (that immediately following the first breaks) is of very high amplitude and furthermore information from this part of the record is never desired. In any case the amount of this distortion depends upon how well the controlled amplifiers repeat and amplify frequencies corresponding to the speed with which the gain is changed. When reflections are recorded during the second period of control, the limit of the control is within the distortionless range.

Therefore, one of the objects of this invention is the provision of a method and apparatus whereby all the data that is required to be recorded on a particular spread when shot in one direction for the general condition can be recorded on a single seismogram.

Another object of this invention is the provision of a method and apparatus whereby reflections of unusual relative energies may be recorded on a seismogram with the same order of amplitude.

Still another object of this invention is in the provision of a method and apparatus for controlling the gain in amplification to effect a definite recording of first breaks and also reflected waves from shallow as well as deep interfaces.

Another object of this invention is in the provision of means whereby a vacuum tube amplifier is allowed to remain at a high sensitivity until the first impulses of direct traveling waves have been recorded, regardless of the distance from the shot point to the opposite end of the spread; then suppressing the gain in amplification over a predetermined period and then expanding the gain approximately inversely as the magnitude of the energy in the reflections from the subsurface interfaces, so that the seismogram will be a record with all reflections of the same order of amplitude free from phase and frequency distortion, easily interpreted and computed.

Another object of this invention is to provide a method and apparatus whereby the predetermined gain of the amplifiers is wholly within control of the operator, and that this gain is not subject to any time delay relative to the signal nor dependent upon the energy of the detected signal.

This invention has for another of its objects a provision of means whereby the suppression of the gain in amplification of the amplifiers can be initiated by the electrical impulse that is received and recorded at the instant of detonation of the charge of explosive.

This invention also contemplates the provision of means whereby the control of the gain in amplification of a vacuum tube amplifier can be automatically initiated by the discharge of a grid controlled gas filled or glow discharge tube, a relay, or manually with a switch.

Another object of this invention is the provision of means adapted for use with a conventional seismograph amplifier.

This invention further contemplates the provision of means for automatically and in timed sequence causing the gain in amplification as derived from the thermionic tube amplifier to behave in a predetermined manner throughout three controllable periods of time.

Still another object of this invention is to provide a single instrument to control one or more seismograph amplifiers with sufficient independence between channels or amplifiers to take care of variations encountered in reflection seismograph operations.

Another object of this invention is to provide means of reducing the amplifiers' gain in the proper proportion so that the high amplitude of the direct traveling wave immediately following the first impulse will not break or damage the recording galvanometer coils nor interfere with their proper functioning.

Other objects and advantages will become apparent from the following detailed description when considered with the attached drawings in which.

Figure 1A:
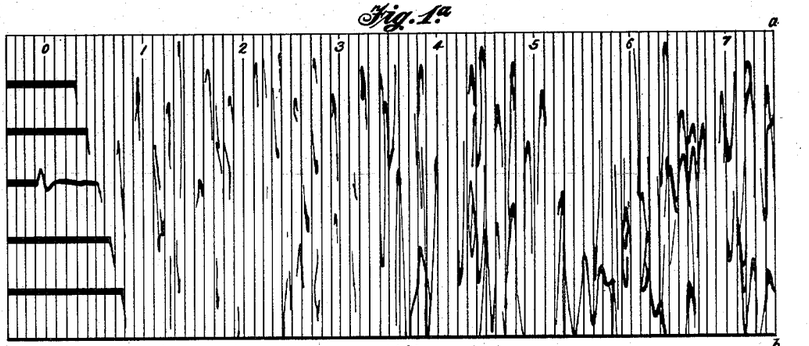
Figure 1a and Figure 1b placed end to end, illustrate a seismogram recorded in the conventional manner.
Figure 1B:
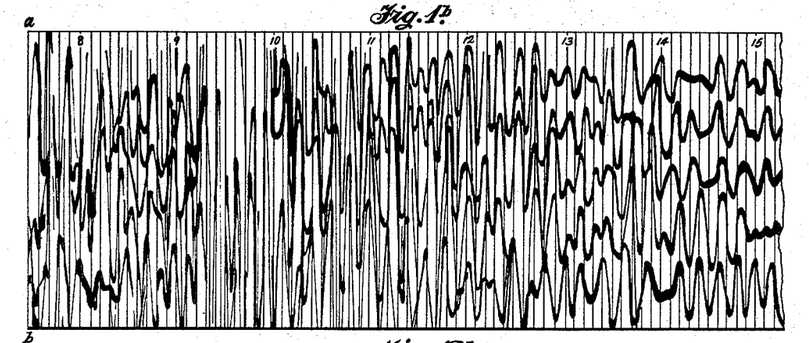
Figure 2A:
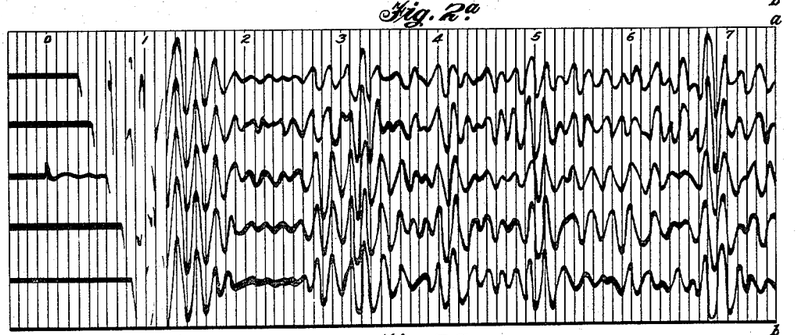
Figure 2a and Figure 2b similarly illustrate a seismogram of the type that can be recorded by the method and with the apparatus of this invention.
Figure 2B:
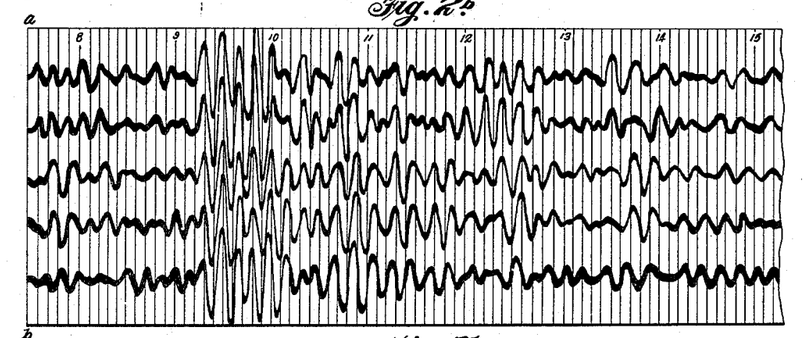
Figure 3A:
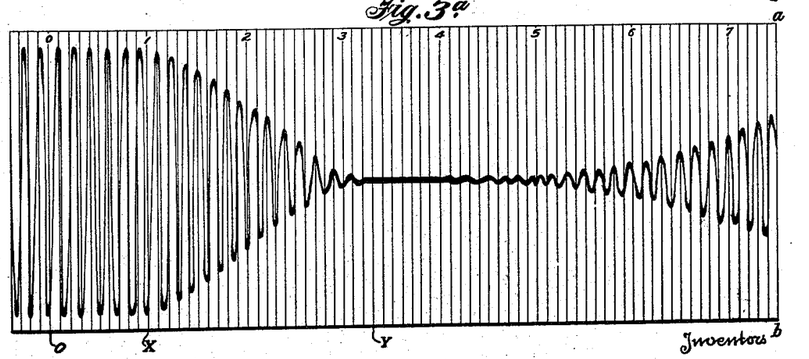
Figures 3a and 3b, placed end to end, illustrate a voltage wave that would result from passing a wave of constant amplitude through an electric seismograph amplifier employing the control forming the subject matter of this invention.
Figure 3B:
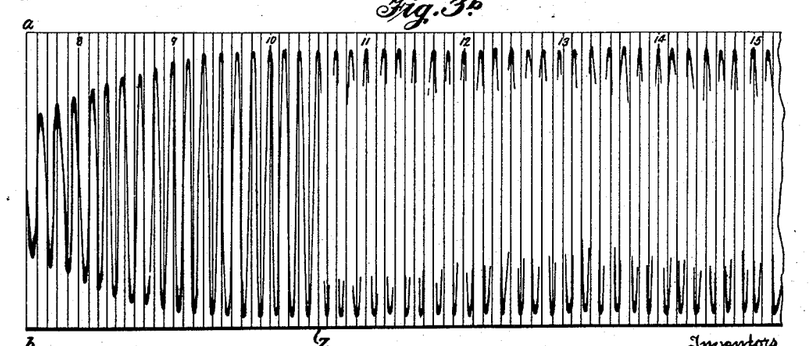

Referring to the drawings in detail, Figures 1a and 1b when placed end to end illustrate a seismogram of the type recorded with the conventional electric seismograph; that is, with no gain control employed. Although this record gives definite first breaks, it is impossible to distinguish reflections from shallow substrata interfaces. Figures 2a and 2b when placed end to end illustrate a seismogram such as would be recorded with the present invention. It will be noted that this seismogram not only shows definite first breaks but shows distinctly reflections that have come from the shallow substrata interfaces as well as those from deep interfaces. To record a seismogram of the character illustrated in Figures 2a and 2b the gain in amplification as derived from the thermionic tube amplifier must be controlled with respect to time as illustrated in Figures 3a and 3b. Such a record results from placing on the input of an amplifier channel a voltage wave of constant frequency and amplitude and causing a variation in the gain in amplification as derived from the amplifier in the manner taught by this application. Referring further to Figures 3a and 3b, it will be noted that the voltage wave is of constant high amplitude representing high gain from the left end of the figure to the point X, the period of time from O to X being made variable and sufficiently long to permit the recording of first breaks on all traces of the multiple galvanometer under the influence of this control. From the point X to Y the gain in amplification as derived from the amplifier is caused to decrease. The period of time X to Y is also made variable and will be described in detail later in the specification. Throughout the period of time from Y to Z the gain in amplification is caused to expand. This expansion is entirely independent of the signal input but it corresponds approximately to the decrease in reflected energy for the deeper geological horizons. As will be explained later the period Y to Z is also variable and under control of the operator. The variation in the gain in amplification as derived from the amplifier as described above and illustrated by Figures 3a and 3b is sequential and automatic in its operation, the initiation of the sequence being by the time break signal. The points O in Figures 1a, 2a and 3a correspond to the time of arrival of the time break signal. When the initiation of the sequence is accomplished by the direct traveling energy arriving at the geophone farthest from the shot point, this first period O to X is eliminated from the control. In this case X marks the point at or just after the arrival of the last first-break and the two remaining periods are carried out as before. The amplifiers in this case also remain at high gain up to the point X as before. The apparatus forming the subject matter of this invention also is capable of producing a record like that in Figures 3a and 3b from the point Y to the right hand side of the record. A record of this nature is produced by having the gain initially suppressed and the expansion initiated by the time break impulse. All of the periods of time on the record are separately controlled for any combination described above.

Figure 4:
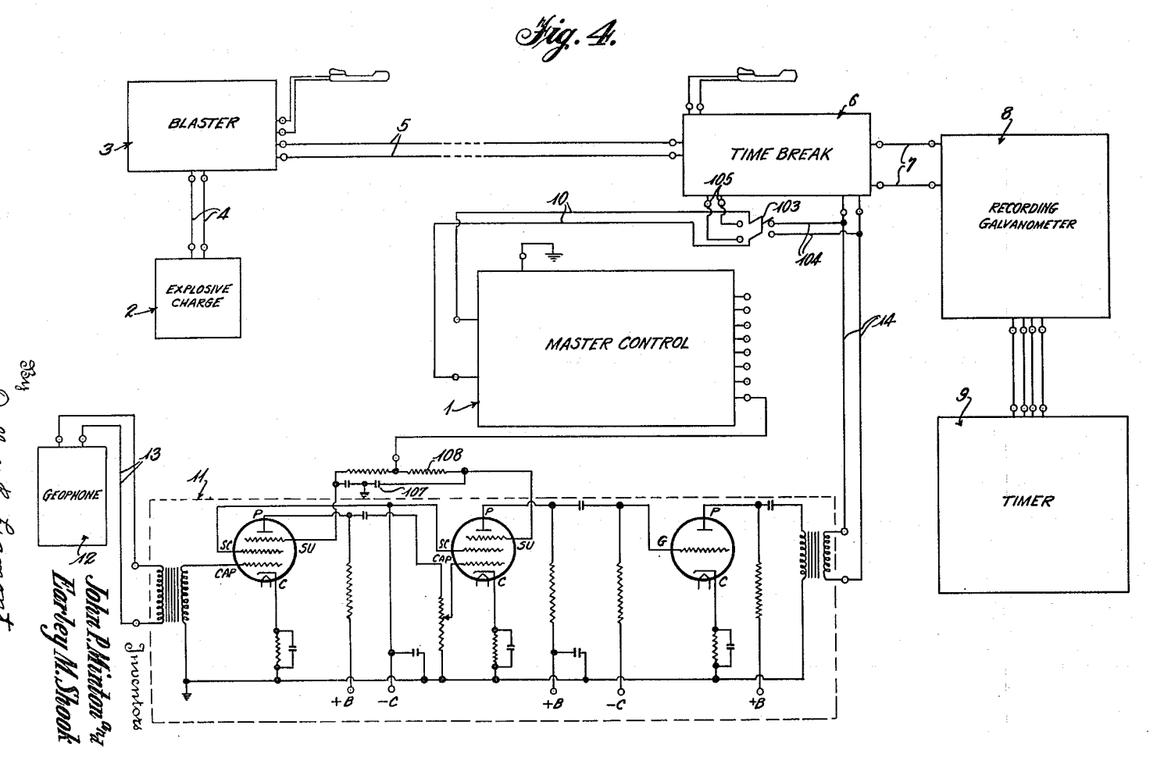
Figure 4 is a composite diagram of a complete electric seismograph shown in part in blocked diagram.

In Figure 4 there is illustrated the manner in which this master control 1, is used with the conventional electric seismograph. An explosive charge 2 is detonated by a blaster 3 to create seismic waves in the earth. The detonation of the explosive charge generates an electric signal which is communicated by means of the conductors 4, the blaster 3, the conductors 5, the time break circuit 6, and the conductors 7, to a recording galvanometer 8, where it is recorded on a seismogram as a record of the instant of detonation of the explosive charge. A timer 9, associated with the recording galvanometer 8, places a record of definite time intervals, usually in the form of transverse lines, on the seismogram. The electrical signal from the blaster, hereafter referred to as the "time-break" signal, is also communicated by means of conductors 105, switch 103, when thrown to left, conductors 10 to the master control 1. This master control then acts to control the gain in amplification as derived from a conventional thermionic tube amplifier such as illustrated in the block 11, formed with dashed lines.

Seismic waves which have been created by the explosive charge are detected by geophone 12. This geophone converts the seismic waves into electrical waves which are in sympathy with them. The electrical waves are conducted to the input of the amplifier by means of conductors 13, where they are amplified with controlled gain in amplification, then through conductors 14 and 7, they are communicated to the recording galvanometer 8, where they are recorded in the form of a seismogram. By throwing switch 103 to the right and making geophone 12 the one farthest from the shot point the initiation of control by the master control is accomplished by the first break or direct traveling energy arriving at geophone 12. This direct traveling energy reaches the master control through conductors 13, amplifier 11, conductors 14, conductors 104, switch 103, conductors 10 to master control 1.

Figure 16:
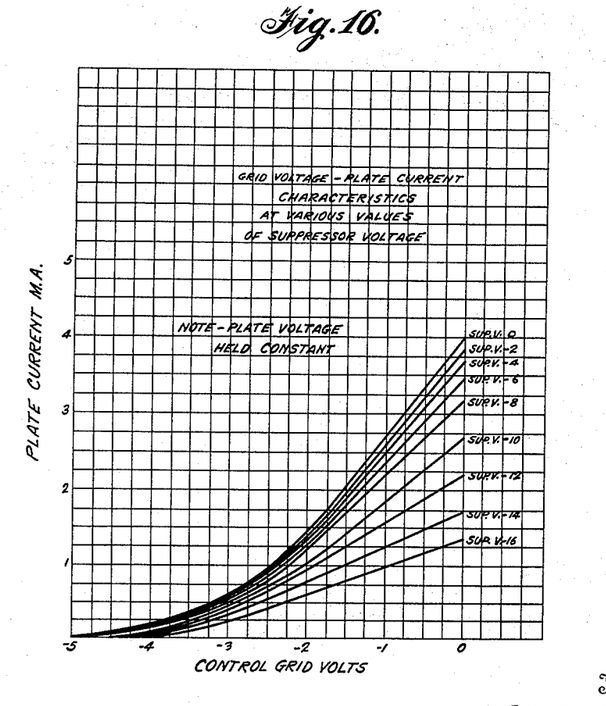
Figure 16 is a group of grid voltage-plate current characteristics of a tube such as is used in combination with the apparatus forming the subject matter of this application.

Variation of gain in amplification as derived from the thermionic tube amplifier 11 is effected by varying the suppressor grid bias on the first two tubes in the amplifier. The manner in which this variation of suppressor grid potential is accomplished will be described in detail in the description of the master control. This variation of the suppressor grid voltage in combination with the master control accounts for the superior performance of this system of amplitude control. It is superior in that the control is not subject to the strength of the signal; it controls at the point where control is needed, and it does not introduce phase or frequency distortion. The first two points will be obvious whereas the points on phase and frequency distortion need some further clarification as follows:

Figure 16 is a number of grid voltage-plate current characteristics all taken with the same plate voltage but each curve taken with a different suppressor voltage as indicated at the right end of each curve. These curves are for the tubes used in the first two stages of the amplifier forming in part the subject matter of this invention. The master control causes the necessary variation in suppressor voltage. When the master control has the gain suppressed, the tubes are operating on a curve of smaller slope. When the master control has the gain suppressed only slightly, the tubes are operating on a curve of large slope. There are two important points involved. The first is that the control grid bias is not disturbed in any manner and that this bias is fixed at some point such that it will operate in the straight portion of the curve regardless of the suppressor voltage and also that this point is such that the signal peaks are within the straight portion. The second important point is that the suppressor voltage is varied at a relatively slow rate. For the shortest seismograms this may be a change from one extreme to the other in one second. This corresponds to a very low frequency, in fact much lower than the amplifier will repeat, and therefore will not introduce any distortion in the base line of the signal.

Figures 17, 18:
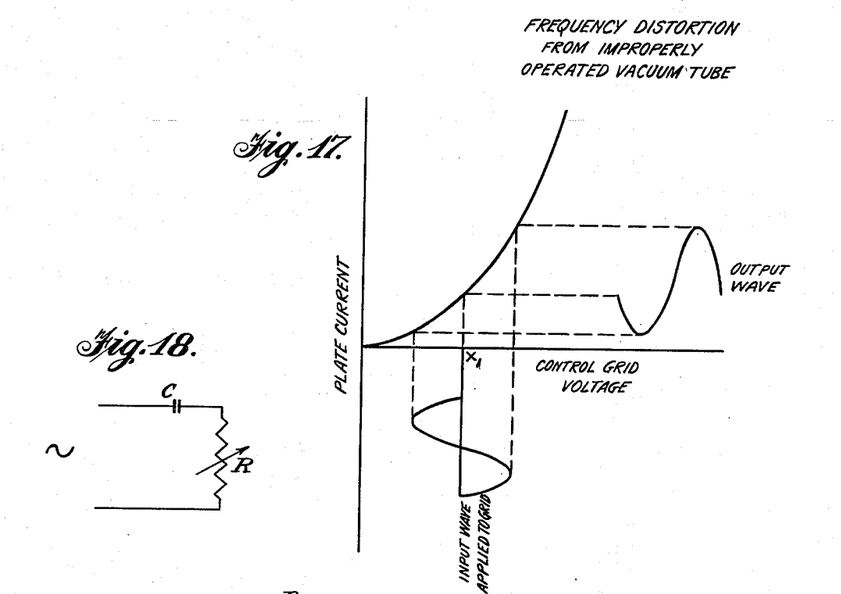
Figure 17 is a typical representation of the performance of a vacuum tube.
Figure 18 represents a simple series condenser variable resistance circuit.

Figure 17 is a graphical representation of the manner in which the signal is affected when the gain is controlled by means of the control grid voltage. As stated above, it is a general theory that for the amplification of a tube to change the slope of the grid voltage-plate current characteristic must change. If, therefore, the control grid bias is held at the point $X_1$ and a pure sine wave applied to the grid as indicated as the input wave, this will result in an output wave that will be distorted as shown. The upper half cycle is more peaked than the bottom half cycle. This output wave contains frequencies (harmonics) that are not present in the input wave. In addition, if this control grid voltage is changed rapidly enough, it may cause distortion of the base line. This theory is common knowledge in the application of vacuum tubes and can be found in almost any text on the subject. The output wave as shown in Figure 17 is the output from the tube and not the amplifier. It may look many times worse after going through the remaining stages of the amplifier. The apparatus forming the subject matter of this invention does not introduce this type of distortion when controlling the gain.

Another means of controlling the gain in amplification is the adaptation of the automatic volume control used in radio receivers. Some attempt to control the gain by rectifying part of the signal and returning it to the grid bias while some have a similar scheme to operate a losser circuit. The fundamental difficulty of applying the losser circuit to an amplifier used in oscillographic work is the introduction of variable phase distortion.

Figure 19:
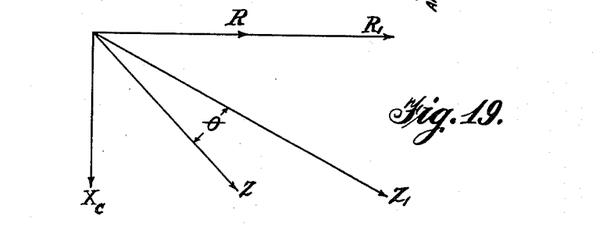
Figure 19 is an impedance vector diagram for the circuit illustrated in Figure 18.
Figure 20:
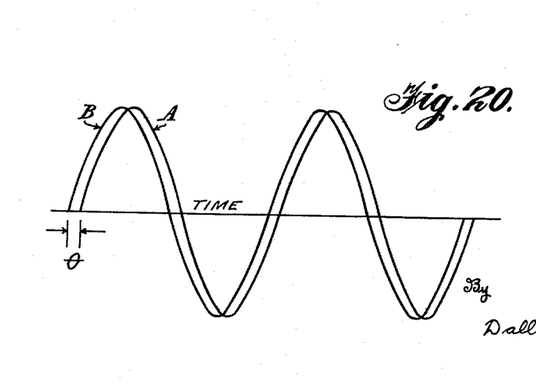
Figure 20 shows two curves A and B whose phases correspond respectively to Z and $Z_1$ of Figure 19.

Figures 18, 19 and 20 illustrate the way in which the losser circuits invariably introduce phase distortion. The fundamental theory or reason for this type of distortion, regardless of whether the circuit contains capacitance or inductance, is the same. The case shown is for a capacitance and resistance, a very typical arrangement in which the condenser C is the blocking condenser and the voltage drop across R is applied to a grid of a following tube. The variable resistor R corresponds to the typical losser circuit. The impedance vector diagram adds R and $X_c$ to give Z which shows the phase of the current flowing in R relative to the input alternating signal. If the resistance changes to $R_1$, then by similar addition the total impedance is $Z_1$, and $Z_1$ is of the same phase as the current flowing in $R_1$. It is evident that the phase has changed the amount of angle $\theta$ just by varying the resistance from a value of R to $R_1$ or in the case of the AVC the resistance of the losser circuit. Figure 20 shows a wave A whose phase corresponds to Z and a wave B whose phase corresponds to $Z_1$. Their difference in phase is $\theta$. This difference in phase with the AVC losser circuit is likely to be much more than indicated on the diagram and it changes in each amplifier indiscriminately with frequency, and therefore with the type and character of the seismic reflections recorded on the seismograms.

Figure 5:
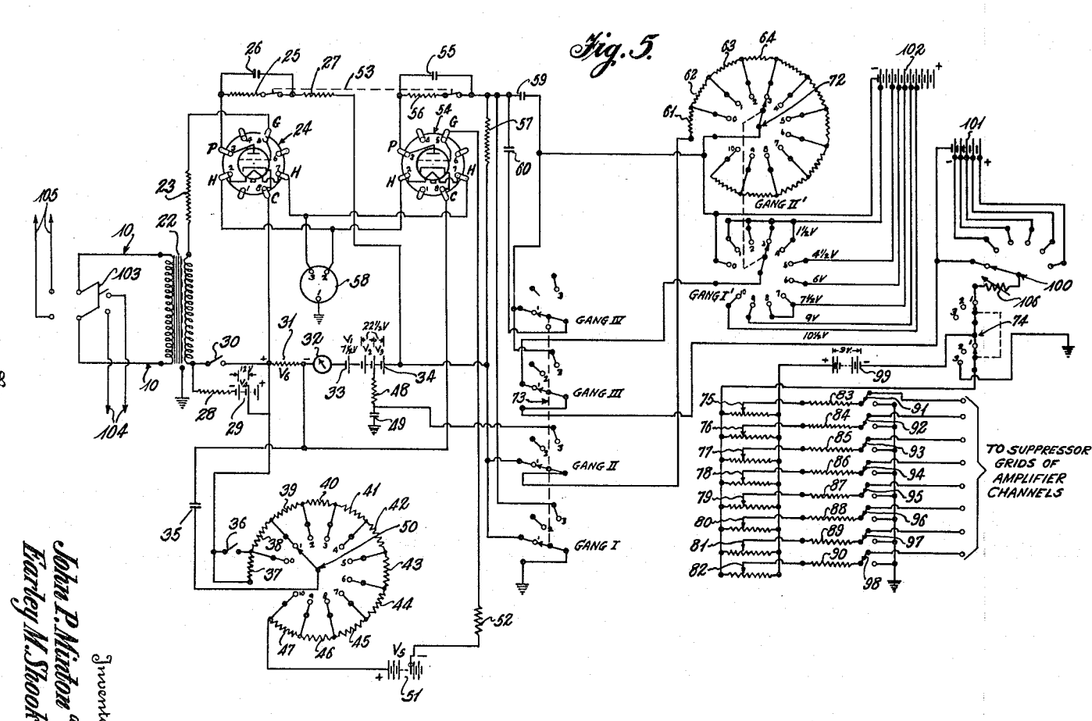
Figure 5 is a schematic diagram of the master control which, when used in combination with the electric seismograph illustrated in Figure 4, forms the subject matter of this application.

An explanation in sequence will be given and then a detailed explanation of the various elements will follow. In the diagram of Figure 5, the events progress from left to right and all apparatus on which a rotary control operates are indicated exactly as they operate when viewing the front of the control panel.

The bias batteries 29 and 51 prevent plate current from flowing in the gas triodes 24 and 54 until some other voltage added in series reduces the negative grid bias to where the grid no longer prevents plate current from flowing. When the time break impulse is repeated by input transformer 22 into the grid circuit of tube 24, the negative grid bias is reduced and the grid loses control and the plate circuit of tube 24 conducts current through: resistor 25, switch 53, resistor 27, batteries 34 and 33, meter 32, resistor 31 and back to the cathode. The above occurs instantaneously. The plate current in resistor 31 produces a voltage drop. The end next to meter 32 is negative and the opposite end is positive. For purpose of explanation neglect for the moment condenser 35. The voltage in the grid circuit of tube 54 is now, tracing from cathode, plus the voltage across resistor 31 minus $V_5$ which is the voltage of battery 51. It is evident that if the sum of these two voltages is small enough negative, the grid of gas triode 54 would lose control and allow plate current to flow. This would happen immediately if it were not for condenser 35 and resistors on switch 50. As soon as a voltage drop appears across 31, current also starts flowing through resistors 37 and 38 to charge condenser 35. This current produces a voltage drop across resistors 37 and 38, which disappears as soon as condenser 35 becomes charged. At the instant the voltage drop appears across resistor 31, the following voltages are added up in the grid circuit of tube 54: tracing from the cathode of 54, plus the voltage drop across 31, minus the voltage drop across resistors 37 and 38, and minus $V_5$ the voltage of battery 51. At the instant in question the voltage across 31 is equal and opposite to the voltage across 37 and 38. The sum of all three voltages in the grid circuit of 54 is that of battery 51. As soon as condenser 35 starts charging, the voltage across resistors 37 and 38 becomes less and the total voltage in the grid circuit of tube 54 becomes less negative. The values of the resistors 37 and 38 also determine the rate at which this voltage changes. By moving the variable tap of switch 50, any or all of the resistors 37 and 47 may be included and obtain a wide range in the rate at which the negative bias on tube 54 is reduced. Since the tube fires at the same grid voltage each time (for a given plate voltage), a wide range in total time is obtained for the potential of the grid to reach the firing potential. The resistor 37 is supported on the same switch as resistors 38 to 47. Its value is equal to the sum of 38 to 47. By opening switch 36 the range is extended and this is designated as "L" for long time. By closing switch 36 the resistor 37 is shorted and the range is designated as "S" for short time.

Continuing to the next series of events, consider all switches in Figure 5 in the positions indicated. Position of switch 73 is for "contractor-expander" operation. When the grid of tube 54 loses control as outlined above, current starts flowing in the plate circuit as follows: plate, resistor 56, switch 53, resistor 57, batteries 34 and 33, meter 32 to cathode of tube 54. This current flow produces instantly a voltage drop across resistor 57. This voltage across 57 charges condensers 59 and 60 through resistors 64, 63, 62, 61 on switch 72 and #1 contact of gang II on switch 73. Condenser 60 is paralleled with condenser 59 through #1 contact of gang IV on switch 73. Note also that a ground is connected to the lower end of resistors 61 and 57 through contact #1 of gang I of switch 73. In the circuit just traced a condenser is being charged with resistance in series. The current through the resistance and, therefore, the voltage across the resistance is a maximum at first and decreases exponentially with time. The variation in voltage across resistors 64—61 is used to control the voltage on the suppressors of the amplifiers. The cathodes of the amplifier tubes are grounded and connected to the ground of the master control of Figure 5 through #1 terminal of plug 58 and the grounded shield of input transformer 22.

The voltage of the movable tap on the resistors of switch 72 is transmitted to the suppressors as follows: negative end of battery 102, through the first cell of battery 102, contact #3 of gang I' of switch 72, #1 contact of gang III on switch 73, #1 contact on switch 100, both contacts on switch 74, the potentiometer movable tap 75, resistor 83, contact of switch 91 to the suppressor. The batteries, potentiometers and associated apparatus just traced are provided for changing the values or limits of this voltage which controls the suppressors. Their functions will be explained in detail later. Since the positive side of "B" batteries 33 and 34 is connected to the ground side of the resistors 61—64, and since current from these batteries is producing the voltages across resistors 61—64, the end of the resistors which is not grounded is negative with respect to ground. With resistor 106 set at zero, the voltage applied to the suppressors is therefore maximum negative the instant plate current starts in tube 54. As condensers 59 and 60 become charged, the current through and, therefore, the voltage across resistors 61—64 becomes less and decreases exponentially with time. Thus, this variation in suppressor voltage causes maximum instantaneous contraction and then less and less contraction of the gain in the amplifiers until full gain is reached. When resistor 106 is set at some finite value other than zero, then the contraction time is no longer zero, but some finite value of time corresponding to the values of the resistances of 106, and of the capacitance of the suppressor condenser 107 in Figure 4 and to the resistances of resistor 108, Figures 4 and 9.

The value of the resistance 61—64 determines the time required to charge condensers 59 and 60. By moving the arm of gang II' switch 72 a wide range of resistance may be inserted to change the time required for the amplifier to regain full sensitivity. The value of resistance in this case also determines the amount of the maximum negative voltage appearing across the suppressors just after contraction. In effect, this changes the amount of contraction which will be explained in detail later. This is undesirable, because the amount of contraction and the time of expansion should have independent controls. For this reason gang I' is added to switch 72 and the change in the amount of contraction is compensated for by tapping battery 102. The peculiar way in which the battery 102 is tapped was necessitated by the values of resistors in gang II' switch 72. This tapped battery is used only when the device is set for "contractor-expander" operation.

Switch 100 and battery 101 are in use for both "contractor-expander" and "expander" operating positions of the master control and the switch 100 selects the proper positive voltage to add to the controlling negative voltage in order to set the amount of the contraction at the desired point. This control acts on all the suppressors alike.

Switch 91 is mounted on potentiometer 75 and is operated at the extreme left end of its travel. Potentiometers 75—82 are used to divide the voltage of battery 99 individually and add any desired part to the controlling voltage for any individual amplifier. They are called individual initial controls.

Switch 74 is used for connecting the individual initial controls to the other part of the circuit and for connecting and disconnecting battery 99. A ground is connected to the suppressors when switch 74 is thrown to extreme left. This allows the amplifiers to assume full gain and is used when the master control is switched to "expander" operation.

A short explanation of the circuit with switch 73 switched over to position 3 for "expander" operation will now be given. When switch 73 is on position 3, battery 102, gang I' of switch 72, and condenser 60, are cut out of the circuit. The ground is switched to the upper end of resistor 57 and $V_3$ volts is put in series with resistor 57 and resistors 61—62. With this connection, before tube 54 starts conducting, a negative potential is applied to the suppressors as follows: ground, contact #3 of gang I of switch 73, resistor 57, minus $V_3$ volts (½ of battery 34), resistor 48, contact #3 gang II of switch 73, resistors 61 to 64, contact #3 gang II' of switch 72, contact #3 gang III of switch 73, switches 100, 74, and 91. This negative $V_3$ volts may be altered some by switch 100 and potentiometers 75 to 82 as pointed out under contractor-expander operation. In any case the amplifiers will be contracted, due to the $V_3$ volts negative just accounted for. When tube 54 starts conducting plate current, there will be a voltage appearing across resistor 57. The upper end of this resistor will be ground and negative and the lower end will be positive. The value of this voltage is of the order of 35 volts. This voltage is opposite in polarity to the $-V_3$ volts in the circuit just traced out and the sum of the two will, after a time, produce a small positive voltage on the suppressors. An inspection will show that condenser 59 is connected across the suppressor controlling circuit to ground. The change in voltage from minus $V_3$ to the small plus voltage on the condenser 59 will require time and this time is determined by the value of resistance in resistor 57 and resistors 61—64. By varying the position of the movable arm gang II' of switch 72 the time required for the suppressors to go from minus $V_3$ to the small plus voltage can be varied over the desired range. The position of switch 100 and the movable arm on potentiometers 75 to 82 determine the initial and final values of suppressor potentials.

One important point which was assumed to be understood is that the gain in the amplifiers is practically unchanged by the voltage of the suppressors going from zero to a positive potential. All of the control is in the range where the suppressors are negative.

Figure 6:
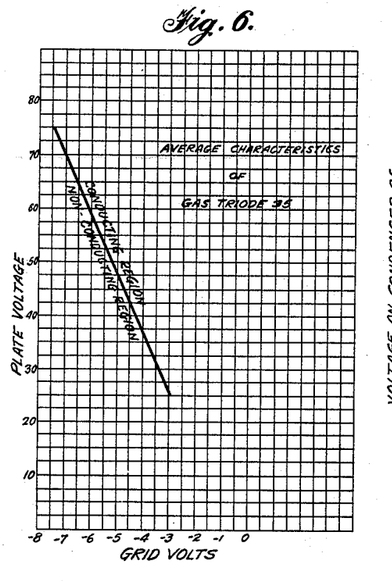
Figure 6 is the average characteristic of a gas triode with grid voltage as abscissae and plate voltage as ordinates.

Referring to Figure 6, average control characteristics of a gas triode, it is seen that for a given plate voltage there is a definite negative voltage below which allows anode conduction and above which prevents anode conduction. For the discussion to follow the term "the tube fires" will be used to indicate when the anode starts conducting. The outstanding characteristic of the gas triode—once the tube fires, the grid entirely loses control of the plate current until the plate voltage is removed—must be kept in mind also in the following discussion.

In the case of the contractor-expander master control the plate voltage is of the order of magnitude of 52½ volts. According to Figure 6, the gas triode fires when the negative grid voltage is less than 5.5 volts. From Figure 5 the negative grid voltage, $V_4$ is 12 volts. In order to make the gas triode 24 fire, the time break impulse must induce in the secondary of the transformer 22 a voltage opposite to $V_4$, the value of which will be enough to reduce the sum acting on the grid below minus 5.5 volts. The amplitude of the time break has been adjusted to be of sufficient value to cause the gas triode 24 to fire with the specified values of grid and plate voltages. The grid voltage is set sufficiently minus in order that any ordinary electrical disturbance will not cause the gas triode 24 to fire. It is seen that the gas triode 24 fires at the same time the dynamite is fired.

Figure 7:
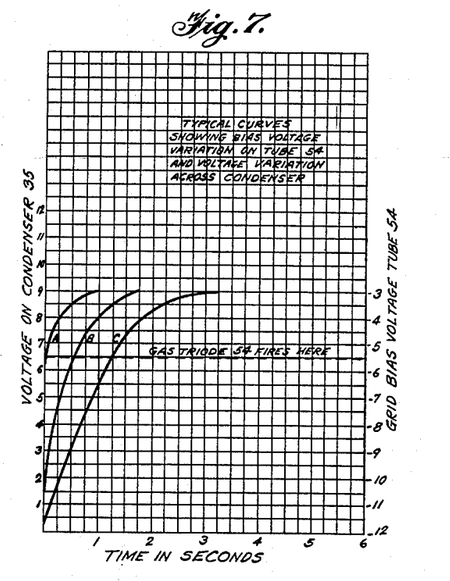
Figure 7 is a group of curves illustrating the manner in which the firing of the gas triode can be delayed over a predetermined period of time.
Figure 8:
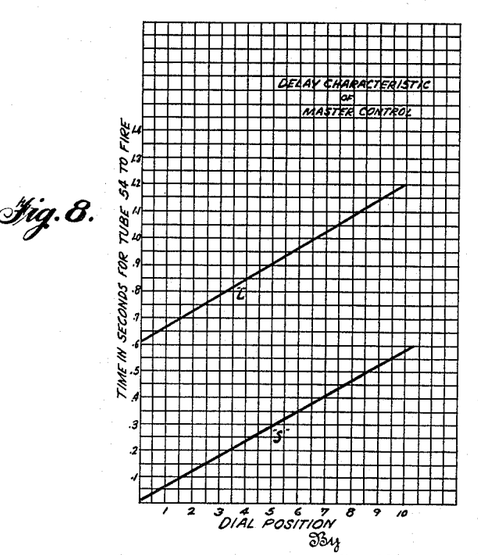
Figure 8 shows curves that illustrate the delay characteristics of the master control forming the subject matter of this application.
Figure 15:
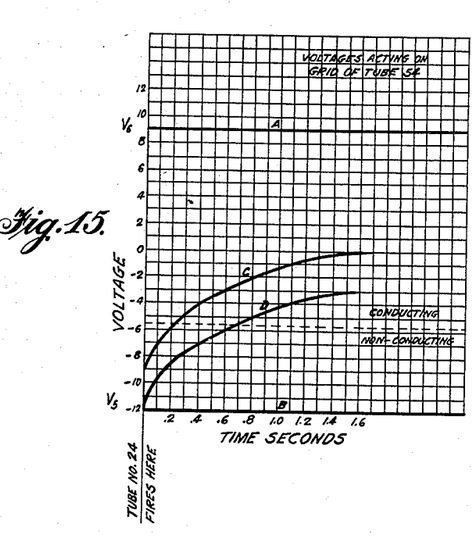
Figure 15 is a graphical representation of all the voltages acting in the grid circuit of one of the gas triodes showing how the delay in firing is accomplished.

The process of delaying and controlling the time for firing gas triode 54 will now be detailed. The negative grid voltage of triode 54 is $V_5$. It is seen that when the condenser 35 reaches a sufficient charge the gas triode 54 will fire. Or when the total voltage (plus the voltage across resistor 31, minus the voltage across resistors 37 and 38, minus the voltage $V_5$) reaches minus 5.5 volts, gas triode 54 will fire. Referring to Figure 7, in which three curves A, B and C are shown which represent the way the voltage on condenser 35 varies for three values of resistance 37—47. Curve A represents the way the voltage builds up on condenser 35 with a very low value of resistance, B with a medium value and C with all the resistance 37—47 in the circuit. The value of the voltage across resistor 31 is $V_6$ volts when plate current is flowing in gas triode 24. Figure 15 illustrates the way in which the grid voltage of gas triode 54 is controlled. Curve A represents the voltage ($V_6$) across resistor 31. Curve B represents the voltage ($-V_5$) of battery 51. Curve C represents the voltage drop in resistors included on switch 50. Curve D is the sum of all these voltages. When the total or bias voltage curve D falls below 5.5, the gas triode fires. The time for firing of gas triode 54 is varied by varying the amount of resistance included on switch 50. The values are chosen so that practically a linear relation exists between resistance 37—47 and the time required for triode 54 to fire. Figure 8 is a test curve showing this linearity. Each change in dial position changes the resistance the same amount. The curve "S", Figure 8, is taken with switch 36 closed and "L" is taken with switch 36 open. By adjusting the moving arm of switch 50 any delay may be obtained from zero up to 1.2 seconds in steps of .06 second, or in any other manner as may be desirable.

The action of the device up to this point is exactly the same for either "contractor-expander" or "expander" operation. The firing of the gas triode 54 in the case of "contractor-expander" operations starts contraction before expansion whereas firing of 54 in the case of "expander" operation starts expansion. When gas triode 54 fires, a maximum voltage drop immediately appears across resistor 57. This voltage is impressed across resistors 61—64 in series with the parallel combination of condensers 59 and 60.

Figures 9, 10:
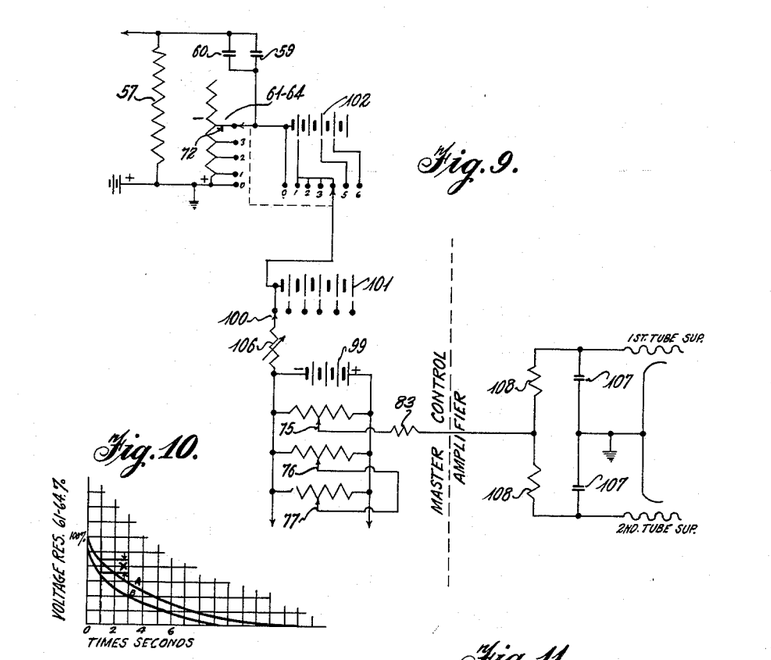
Figure 9 shows a simplified electrical circuit of part of Figure 5 for the purpose of explanation.
Figure 10 shows two curves illustrating the manner in which the voltage drop across a resistor in series with a condenser being charged varies with time.
Figure 11:
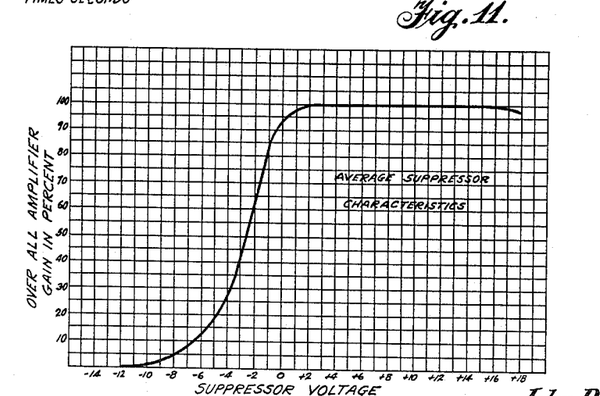
Figure 11 shows a curve representing the average characteristic of an amplifier in which the suppressor grid voltage is plotted as abscissae and the overall amplifier gain in percent is plotted as ordinates.
Figure 12:
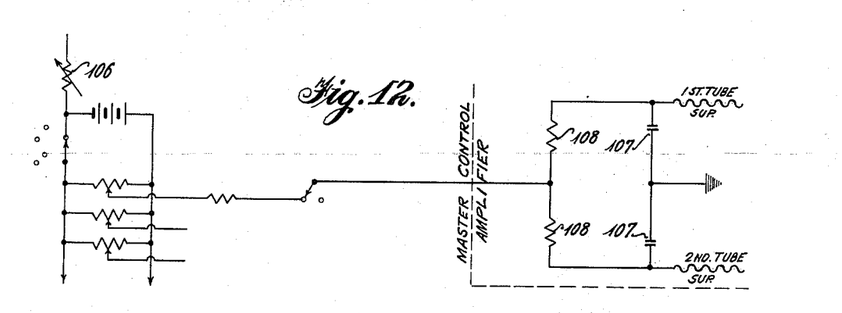
Figure 12 is a diagrammatic illustration of the manner in which the control forming the subject matter of this application is applied to the suppressor grids of the thermionic tubes in the amplifier channel.

Figure 9 shows a simplified electrical connection involving the same essential connections as that given in Figure 5. The elements are designated by the same numbers in each figure. It is seen from the direction of current flow, in resistor 57 that the lower end is positive and the upper end is negative. When this voltage first appears across 57 it begins charging condensers 59 and 60 and this charging current flowing through resistors 61—64 produces a voltage drop, the polarity of which is shown, positive at the lower end and negative at the upper end. It is seen that this voltage is impressed upon the suppressors of the tubes in the amplifier such that the suppressor assumes a negative potential with respect to the cathode. This negative potential renders the tubes insensitive and reduces the gain of the amplifiers. The relation between suppressor voltage and overall amplifier gain is shown in Figure 11 which is average suppressor characteristic of a group of tubes selected for amplifier use. The current through and, therefore, the voltage across resistors 61—64 is maximum at first and then decreases exponentially with time as indicated in the graph in Figure 10. The potential on the suppressor of the amplifier tubes goes through approximately the same variations as the voltage across resistors 61—64. The maximum value is controlled by switch 100 and potentiometer 75 and it might be well to notice at this point that it is probable that a positive potential will exist on the suppressor after the voltage dies down across resistors 61—64. This does not cause any difficulty within the range used as revealed by Figure 11. The amplifier is at approximately full gain at zero potential on the suppressor and a positive potential does not produce any appreciable change in amplification. The control of the maximum value of contraction exercised by switch 100 and potentiometer 75 is necessary in order to record with correct amplitude the energy received immediately following contraction, because the gain of the amplifiers starts expanding from that point. Contraction is not obtained instantly as might be expected from the graph in Figure 10 for two reasons. First, there is a resistance-capacity circuit, (197, 108, Figures 4 and 11), associated with the suppressors in the amplifier. The time constant of this combination is short enough to allow the gain to contact in approximately one-tenth of a second. Second, it takes about one-tenth second for the amplifier to become stable after the sudden application of suppressor voltage. Since this suppressor voltage changes the plate current in the tubes, distortion in the output of the amplifier is produced during the one-tenth second mentioned above. The time required for the voltage across resistors 61 to 64 to fall substantially to zero is determined by the value of resistance 61 to 64. This total value of resistance is varied by means of the moving arm of switch 72.

Referring to the graph in Figure 10, curve A represents the voltage across resistors of a larger value whereas curve B represents the voltage variation across the resistors of a smaller value. Remembering that .1 second is required for contraction as stated in the paragraph immediately above, it is seen that the voltage of curve A at one-tenth second is higher that that of the curve B at one-tenth second. If the same amount of contraction is desired in either case A or B, some compensation for this difference in voltage at .1 second must be provided. Battery 102 is tapped by gang I' of switch 72 for this purpose.

Resistors 23 and 52 are grid leaks of suitable resistance provided to limit the grid current in the gas triodes.

The resistor 25 and condenser 26, also resistor 56 and condenser 55, are connected in the plate circuits of tubes 24 and 54 respectively, as indicated, for the purpose of preventing the sudden application of plate voltage to the gas triodes. Switch 53, normally closed, is a push-button switch and is pushed open to remove the plate voltage in order to stop the flow of plate current. When the switch 53 is released, contact is made and the plate circuit is completed. It was found that it required about twice as much negative grid voltage to prevent plate current from starting when the plate voltage was applied suddenly as it required when the plate voltage was gradually applied. Considering tube 24, when switch 53 opens, plate current ceases as condenser 26 becomes charged or the plate currents stop when the voltage across the plate cathode circuit falls below the critical value. It is seen that when switch 53 is opened to stop the plate current, condenser 26 becomes charged. When switch 53 is released, condenser 26 is discharged through the resistor 25. This discharge current produces a voltage drop which opposes the applied battery voltage. The resistor 25 and condenser 26 are selected to allow the plate-cathode voltage to rise slowly enough to keep the tube 24 from firing when switch 53 closes.

Figure 13:
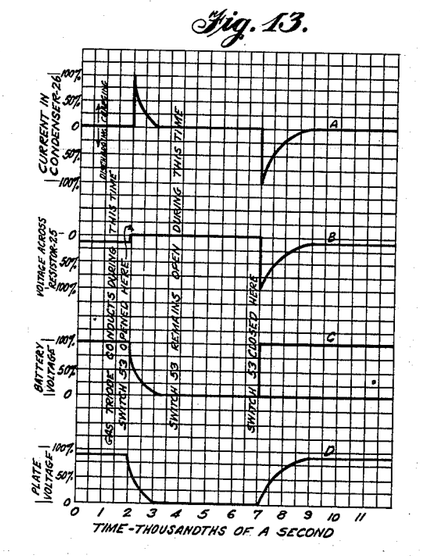
Figure 13 illustrates the manner in which the voltage varies on the plates of the gas triodes which are a part of the subject matter of this application.

Figure 13 is a graphic representation of the action just described. All events are plotted to the same (assumed) time scale. The result, as seen in curve D, is that the voltage from plate to cathode was made to rise gradually. Without the resistor 25 and condenser 26 the voltage, plate-cathode, would rise abruptly or instantly, which as previously pointed out was undesirable. Other schemes more commonly practiced for allowing a gradual rise in plate voltage were tried, but in every case it complicated and upset the operation of the circuit. This scheme gives perfectly satisfactory operation.

Switch 30 is provided for removing the grid bias from gas triode 24 for test. Resistor 28 is in series with battery 29 to limit the current and protect battery 29 when switch 30 is closed for test.

Figure 14:
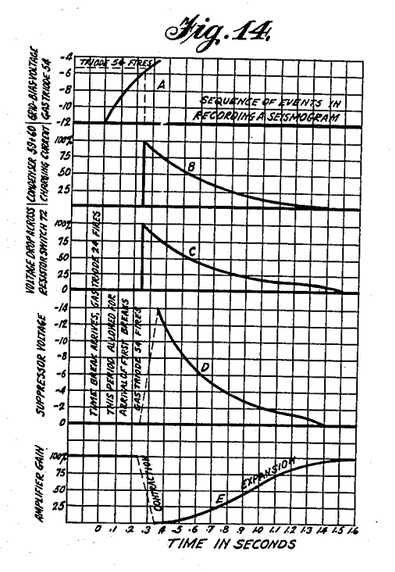
Figure 14 is a group of curves illustrating the sequence of events and simultaneous values of the various factors of control which occur during the recording of a seismogram.

Figure 14 illustrates graphically the essential events occurring during the process of recording a seismogram with the master control switched to "contractor-expander" operation. All curves and events are plotted against the same time axis. It is assumed that both gas triodes are not conducting at the beginning of the record. Curve E is the result of the events depicted in A, B, C, D and Figure 11. No negative voltage exists in the suppressor circuit with tubes 24 and 54 non-conducting and the gain curve E is a maximum or 100%. The time break arrives and gas triode 24 fires simultaneously. This is shown at zero time. Between zero time and .25 second the negative grid voltage of gas triode 54 changes from −12 to −5.5 volts as shown in A. For 52½ volts plate voltage, the characteristic in Figure 6, says the gas triode fires at minus 5.5 volts. Then at .25 second gas triode 54 fires and maximum current flows in condensers 59 and 60 as illustrated in curve B, Figure 14. This maximum current produces a maximum drop across resistors on gang II' of switch 72, as shown in curve C, Figure 14. The maximum voltage drop across resistors on switch 72 is applied to the suppressors and contraction occurs as shown in E from .25 to .35 second. It requires .1 second for contraction to take place, as previously pointed out. There is distortion introduced also during the .1 second. This distortion, however, will be masked by the high energy arriving, and further, no information is used or desired from the record during this interval and the distortion causes no difficulty. The gradual decrease in voltage indicated in curve C from .25 second to 1.5 seconds causes a decrease in the amount the gain is contracted, as shown in E from 3.5 seconds to 1.5 seconds. Curve E is the direct result of curves D, Figure 14 and the curve of Figure 11. It is assumed that the maximum voltage applied to the suppressors is −14 volts. This voltage falls exponentially as shown in curve D, Figure 14. In order to plot curve E, a value on curve E is found for .6 second, curve D is read at .6 second and this corresponds to a suppressor voltage of −6.4 volts. From Figure 11, −6.4 volts corresponds to a gain of 9%. This 9% is plotted for the gain on curve E, Figure 14 at .6 second. Instead of the expansion curve E, Figure 14, being in inverse of curve D, it is a smooth curve which approaches the desired shape. It rises at first approximately exponentially and then near the end of expansion it tapers off to full gain.

With the gain of the amplifiers controlled in this manner, two important additional pieces of information are recorded. First, the amount of disturbance will be known to the observer up to the time the shot is fired and this disturbance will be recorded for reference of computers. The computer will know how much disturbance existed at the time the seismogram was taken. Second, with proper setting of the delay circuit, switches 36 and 50, the correct delay will be selected which will allow the first breaks to be recorded just before contraction.

There is one other feature which will be of value in special cases. It has been found that sometimes it is desired to record two reflections arriving close together out on the record, the first of which has high energy and the second has low energy. In order to record these two reflections at about the same amplitude on the seismogram, the delay feature controlled by switches 36 and 50 is set so that contraction will have been completed just before the first reflection and the gain will be low. The value of gain just after contraction is adjusted by the initial controls, switch 100 and potentiometers 75 to 82, Figure 5, as previously explained. The rate at which expansion from this point occurs is adjustable by switch 72. With switch 72 set for a short time for the gain to increase, the gain will increase rapidly and amplify the second reflection to the correct amplitude. This feature is available with either "contractor-expander" or "expander" operation. Furthermore, by adjustment of resistor 106, Figure 5, it is possible to control the rate of contraction, and record reflections on both the contraction and expansion portions of the records.

We claim:

In an apparatus for seismic prospecting that comprises means for generating a series of seismic waves, means for detecting said waves at a distant point, means for amplifying said detected waves and means for recording said amplified waves, the improvement that comprises means for changing the degree of amplification during the reception of a series of waves in accordance with a pre-set time schedule, entirely independently of control by the amplitude of the waves, said pre-set time schedule being comprised of three definite periods, the first of which consists of a pre-set period of time at the beginning of the schedule, during which period of time the degree of amplification is constant and relatively high, the second of which consists of a pre-set period of time, immediately following the first, and during which time the degree of amplification is reduced from the relatively high degree of the first period to a relatively low degree, and the third of which consists of a pre-set period of time, immediately following the second, and during which the degree of amplification is increased from the relatively low degree to a relatively high degree, said means for changing the degree of amplification including means for separately, manually adjusting each of the three pre-set time periods.

JOHN P. MINTON.
EARLEY M. SHOOK.